UNITED STATES PATENT OFFICE.

LUDWIG TAUB, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AMID OF BETA-BETA-METHYLPROPYLPROPIONIC ACID.

961,385.  Specification of Letters Patent.  Patented June 14, 1910.

No Drawing.  Application filed October 21, 1909.  Serial No. 523,805.  (Specimens.)

*To all whom it may concern:*

Be it known that I, LUDWIG TAUB, doctor of philosophy, chemist, citizen of the German Empire, residing at Elberfeld, Germany, have invented new and useful Improvements in Amid of Beta-Beta-Methylpropylpropionic Acid, of which the following is a specification.

My invention relates to the manufacture and production of a new valuable pharmaceutical product which is chemically the amid of beta-beta-methylpropyl-propionic acid, and which according to my researches is a valuable sedative. For the isomeric amid of beta-beta-diethyl-propionic acid I have filed a separate application Serial No. 543,978 dated February 15, 1910.

The new product is a crystalline compound soluble in hot alcohol and hot benzene. When reacted upon by hot alkalies it is split up into the free acid and ammonia.

In carrying out my process practically I can proceed as follows, the parts being by weight: 390 parts of methylpropylpropionic acid are heated with 135 parts of phosphorus trichlorid to 100° C., the liquid is then poured off from the produced phosphoric acid and distilled *in vacuo*. The chlorid of beta-beta-methylpropylpropionic acid which is thus obtained is treated with an excess of ammonia, the amid is filtered off and crystallized from benzene. It is a white crystalline powder melting at 99° C. soluble in hot alcohol and hot benzene, liberating the free acid when reacted upon by caustic alkali and exhibiting valuable sedative properties, an average dose being about ½ to 1 gram.

The reaction probably takes place according to the following formulæ:

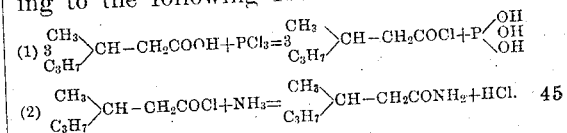

I claim:

The herein described new amid of beta-beta-methylpropylpropionic acid being a white crystalline powder melting at 99° C., soluble in hot alcohol and hot benzene, liberating the free acid when reacted upon by caustic alkali and exhibiting valuable sedative properties, substantially as described.

In testimony whereof I have hereunto set my hand in the presence of two subscribing witnesses.

LUDWIG TAUB. [L. S.]

Witnesses:
 OTTO KÖNIG,
 CHAS. J. WRIGHT.